US009255737B2

(12) United States Patent
Ramirez Dala

(10) Patent No.: US 9,255,737 B2
(45) Date of Patent: Feb. 9, 2016

(54) EXTERNAL INSULATION SYSTEM FOR TANKS AND THE LIKE

(76) Inventor: Jhonny Ramon Ramirez Dala, Anzoategui (VE)

( * ) Notice: Subject to any disclaimer, the term of this patent is extended or adjusted under 35 U.S.C. 154(b) by 469 days.

(21) Appl. No.: 13/461,826

(22) Filed: May 2, 2012

(65) Prior Publication Data

US 2013/0292391 A1 Nov. 7, 2013

(51) Int. Cl.

| | |
|---|---|
| ***B65D 5/58*** | (2006.01) |
| ***B65D 6/00*** | (2006.01) |
| ***B65D 8/04*** | (2006.01) |
| ***B65D 8/18*** | (2006.01) |
| ***B65D 25/00*** | (2006.01) |
| ***B65D 90/00*** | (2006.01) |
| ***B65D 90/02*** | (2006.01) |
| ***B65D 90/06*** | (2006.01) |
| ***B65D 90/08*** | (2006.01) |
| ***B65D 81/38*** | (2006.01) |
| ***B65D 83/72*** | (2006.01) |
| ***F16L 59/12*** | (2006.01) |
| ***F17C 1/00*** | (2006.01) |
| ***F17C 3/00*** | (2006.01) |
| ***F17C 13/00*** | (2006.01) |
| ***B65D 88/00*** | (2006.01) |
| ***A47J 39/00*** | (2006.01) |
| ***A47J 41/00*** | (2006.01) |
| ***F27D 1/00*** | (2006.01) |
| ***F27B 17/00*** | (2006.01) |

(52) U.S. Cl.

CPC .............. *F27D 1/0033* (2013.01); *F27B 17/00* (2013.01); *B65D 90/06* (2013.01); *F28F 2270/00* (2013.01); *Y10T 29/49826* (2015.01)

(58) Field of Classification Search

CPC .......... B65D 5/58; B65D 90/06; B65D 90/08; B65D 81/3802; F16L 59/12; Y10S 220/09; F27D 1/0033

USPC ............... 220/560.12, 567.3, 592.24, 592.26, 220/680, DIG. 9

See application file for complete search history.

(56) References Cited

U.S. PATENT DOCUMENTS

| | | | | |
|---|---|---|---|---|
| 2,983,340 | A * | 5/1961 | Zittle | 52/245 |
| 3,456,835 | A * | 7/1969 | Marcmann | 220/565 |
| 3,811,593 | A * | 5/1974 | Bridges et al. | 220/560.07 |
| 3,931,424 | A * | 1/1976 | Helf | F17C 3/04 428/33 |
| 4,640,437 | A * | 2/1987 | Weingartner | 220/560.12 |
| 6,921,564 | B1 * | 7/2005 | Keenan | 428/36.91 |
| 6,967,051 | B1 * | 11/2005 | Augustynowicz | B32B 7/02 428/68 |

* cited by examiner

*Primary Examiner* — Fenn Mathew
*Assistant Examiner* — Andrew T Kirsch
(74) *Attorney, Agent, or Firm* — Law Offices of Michael L. Wise, LLC

(57) ABSTRACT

An apparatus comprises a vessel, a first vertical support, a second vertical support, and a series of insulating panels. The first vertical support and the second vertical support are fixated to the vessel such that the first vertical support is spaced apart from the second vertical support. Each of the insulating panels in the series of insulating panels is supported between the first vertical support and the second vertical support. Moreover, each insulating panel in the series of insulating panels slidably overlaps one or more adjacent insulating panels in the series of insulating panels.

19 Claims, 6 Drawing Sheets

505
400
600
605
505
400
110
605
120
100
115
235
610
230
200
235
340
310
300
335

Fig. 7C
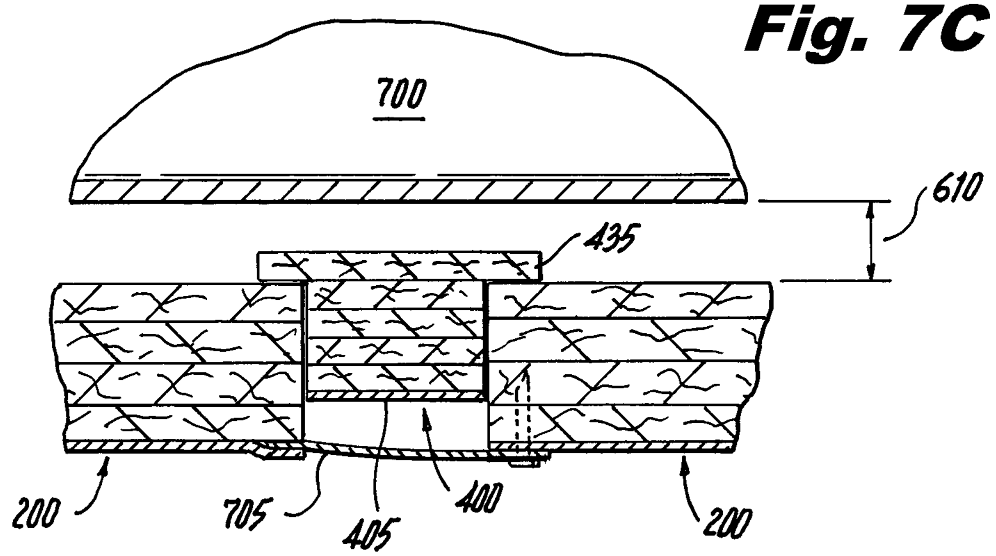
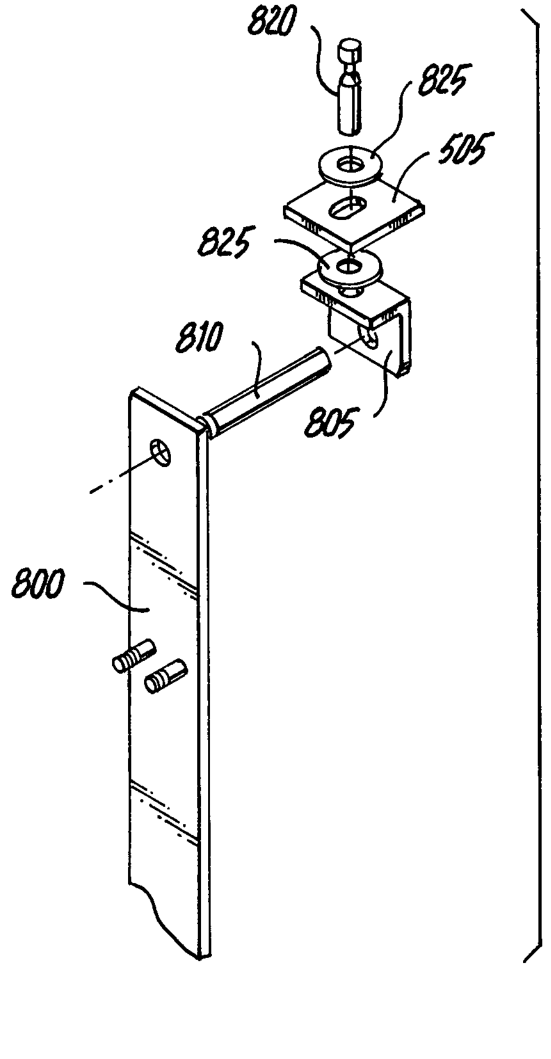
Fig. 8

EXTERNAL INSULATION SYSTEM FOR TANKS AND THE LIKE

FIELD OF THE INVENTION

The present invention relates generally to systems for providing thermal insulation to tanks and the like.

BACKGROUND OF THE INVENTION

Heated towers, reactors, drums, tanks, pipes, vessels, and the like (hereinafter "heated vessels") are used in many manufacturing processes. A coker unit, for example, is a form of drum or tank used to convert residual oil from a distillation column of an oil refinery into low molecular weight hydrocarbon gases, naphtha, light and heavy gas oils, and petroleum coke. A coker unit typically operates by thermally cracking the long chain hydrocarbon molecules in the residual oil feed into shorter chain molecules by heating the residual oil up to about 480 degrees Celsius over a 14-20 hour period.

Many heated vessels utilized in manufacturing are thermally isolated through the use of external insulation systems. These external insulation systems may comprise a mineral fiber or a ceramic material (e.g., calcium silicate) that is applied directly to the outside of the heated vessel and fixated thereon with wire or stainless steel banding. An external jacket is then frequently applied to protect the insulation from moisture and other ambient conditions. Nevertheless, while such external insulation systems are in widespread use, they suffer from several disadvantages. One such disadvantage is the possibility of "corrosion under insulation" (CUI). In CUI, water condensation occurs on the vessel under the insulation. Corrosion of the vessel is thereby enhanced. Another disadvantage of currently implemented external insulation systems relates to fatigue cracking. Many heated vessels are formed of low alloy steels that are vulnerable to forming fractures as a result of repeated thermal cycling. Numerous coker units, for example, have been found to exhibit fatigue cracks after a few thousand heating cycles. Accordingly, as a result of both CUI and fatigue cracking, most heated vessels must be inspected on a regular basis to determine vessel integrity. Where issues are found, repairs must be performed. Unfortunately, currently available external insulation systems do not facilitate this kind of inspection and maintenance. Instead, large portions of the external insulation system typically must be removed to gain access to the underlying heated vessel, consuming both time and manpower while the heated vessel is out of service.

For at least the foregoing reasons, there is therefore a need for new external insulation systems that facilitate both the localized inspection and maintenance of heated vessels. Ideally, such new external insulation systems will also be easy to install, provide excellent thermal isolation, allow adequate thermal expansion and contraction of the underlying heated vessels, be effective barriers to the intrusion of water and other atmospheric elements, and be cost effective.

SUMMARY OF THE INVENTION

Embodiments of the present invention address the above-identified need by providing novel external insulation systems that facilitate the localized inspection and maintenance of underlying vessels. At the same time, these external insulation systems are easy to install, provide excellent thermal isolation, allow adequate thermal expansion and contraction of the underlying heated vessels, are effective barriers to the intrusion of water and other atmospheric elements, and are cost effective.

In accordance with an aspect of the invention, an apparatus comprises a vessel, a first vertical support, a second vertical support, and a series of insulating panels. The first vertical support and the second vertical support are fixated to the vessel such that the first vertical support is spaced apart from the second vertical support. Each of the insulating panels in the series of insulating panels is supported between the first vertical support and the second vertical support. Moreover, each insulating panel in the series of insulating panels slidably overlaps one or more adjacent insulating panels in the series of insulating panels.

In accordance with another aspect of the invention, a method of insulating a vessel comprises fixating a first vertical support and a second vertical support to the vessel such that the first vertical support is spaced apart from the second vertical support. Subsequently, a series of insulating panels is installed so that each insulating panel in the series of insulating panels is supported between the first vertical support and the second vertical support. Each insulating panel in the series of insulating panels slidably overlaps one or more adjacent insulating panels in the series of insulating panels.

In accordance with even another aspect of the invention, an external insulation system for use with a vessel comprises a first vertical support, a second vertical support, and a series of insulating panels. The first vertical support and the second vertical support are adapted to be fixated to the vessel such that the first vertical support is spaced apart from the second vertical support. Each insulating panel in the series of insulating panels, in turn, is adapted to be supported between the first vertical support and the second vertical support so that each insulating panel in the series of insulating panels slidably overlaps one or more adjacent insulating panels in the series of insulating panels.

BRIEF DESCRIPTION OF THE DRAWINGS

These and other features, aspects, and advantages of the present invention will become better understood with regard to the following description, appended claims, and accompanying drawings where:

FIG. 7C shows a sectional view of the FIG. 7A vessel and external insulating system; and FIG. 8 shows an exploded perspective view of an alternative vertical support in accordance with an embodiment of the invention.

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
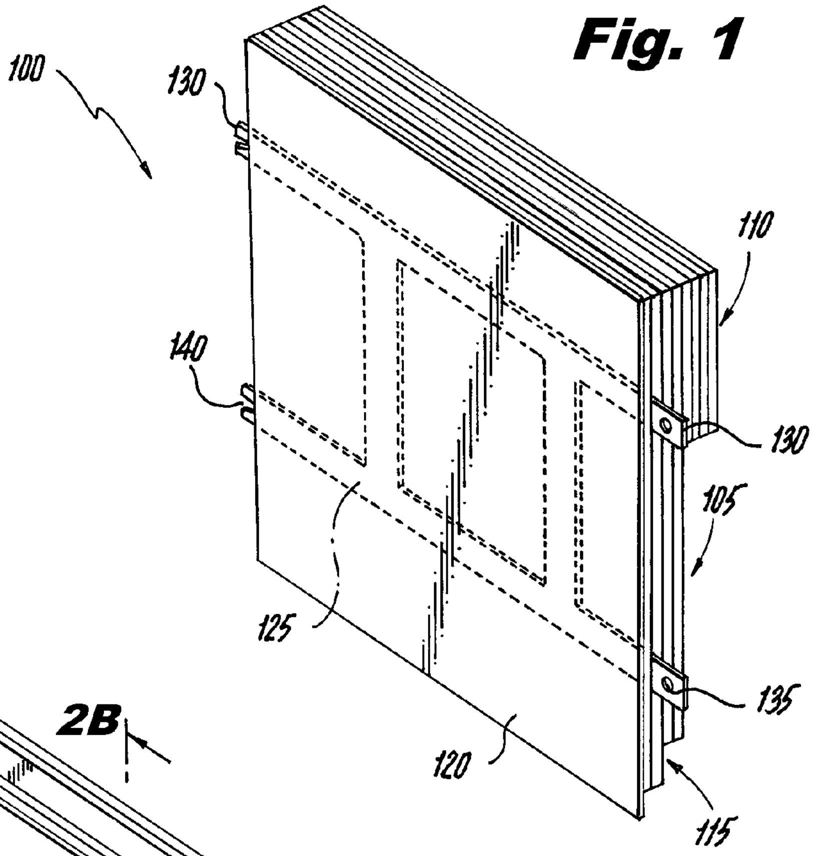
FIG. 1 shows a perspective view of an upper insulating panel in accordance with an illustrative embodiment of the invention.

In an illustrative embodiment of the invention, three different types of insulating panels are utilized to provide an external insulation system for a heated vessel. As used herein, the term "vessel" is intended to encompass any tank, container, tower, column, reactor, drum, pipe, and the like capable of acting as a container or conduit for a solid, liquid, gas, or a combination thereof. The term "heated vessel," in turn, is utilized herein to indicate that the temperature of the vessel is periodically raised substantially above ambient temperature. A representative example of each type of insulating panel is shown in FIGS. 1-3. FIG. 1, for example, shows a perspective view of an upper insulating panel 100. The upper insulating panel 100 comprises a stack of panel insulating layers 105. Near the top of the upper insulating panel 100, extra panel insulating layers 105 form a block portion 110 that projects outward from the remainder of the upper insulating panel 100. Near the bottom of the upper insulating panel 100, the stack of panel insulating layers 105 is arranged such that some of the panel insulating layers 105 are offset from some of the others. This forms a distinct step feature 115 in the stack of panel insulating layers 105 at the bottom edge of the upper insulating panel 100. A protective cover 120 covers the upper insulating panel 100 and extends downward somewhat past the step feature 115.

Mounting strips 125 are built into the upper insulating panel 100, which are observable in the body of the upper insulating panel 100 as dashed lines in FIG. 1 even though, in actual reduction to practice, they would be below the surface. These mounting strips 125 help to provide some additional rigidity and strength to the upper insulating panel 100, and also define lateral mounting extensions 130 that project outward from the upper insulating panel 100. The lateral mounting extensions 130 form a means of fixation for the upper insulating panel 100. In the present illustrative embodiment, the lateral mounting extensions 130 on the right side of the upper insulating panel 100 (as viewed in FIG. 1) each define a respective hole 135 therein. The lateral mounting extensions 130 on the left of the upper insulating panel 100, in contrast, each define a respective slot 140 therein.

Figure 2A:
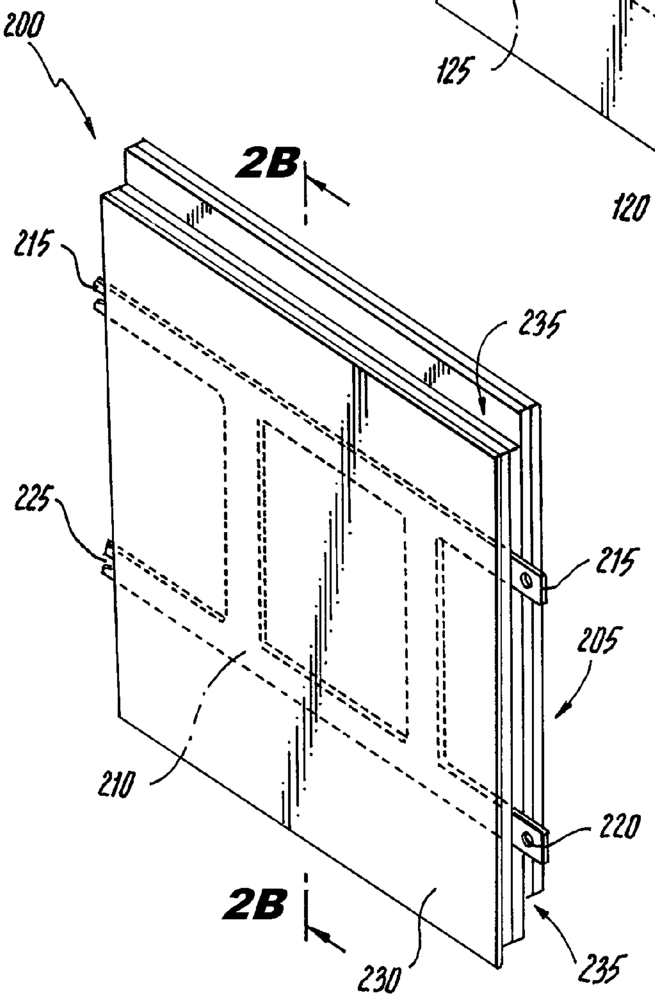
FIG. 2A shows a perspective view of an intermediate insulating panel in accordance with an illustrative embodiment of the invention.
Figure 2B:
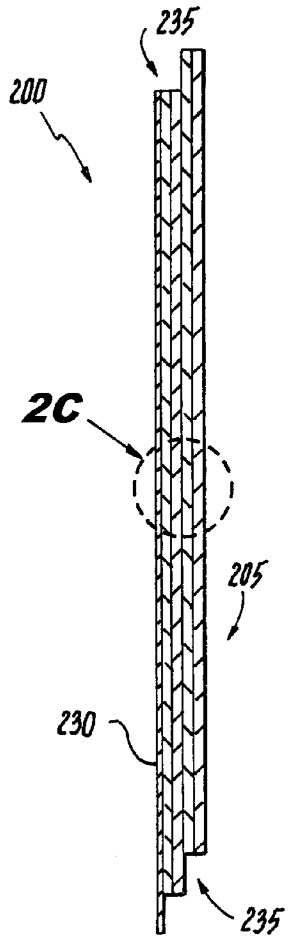
FIG. 2B shows a sectional view of the FIG. 2 insulating panel.
Figure 2C:
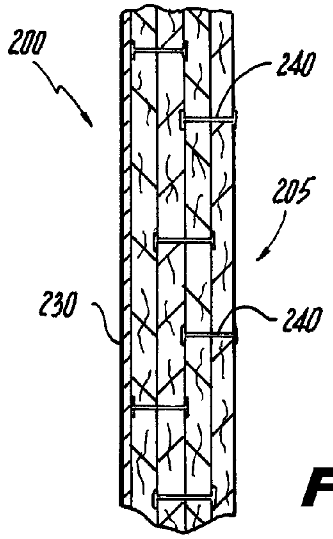
FIG. 2C shows a magnified region of the FIG. 2B sectional view.
Figure 3:
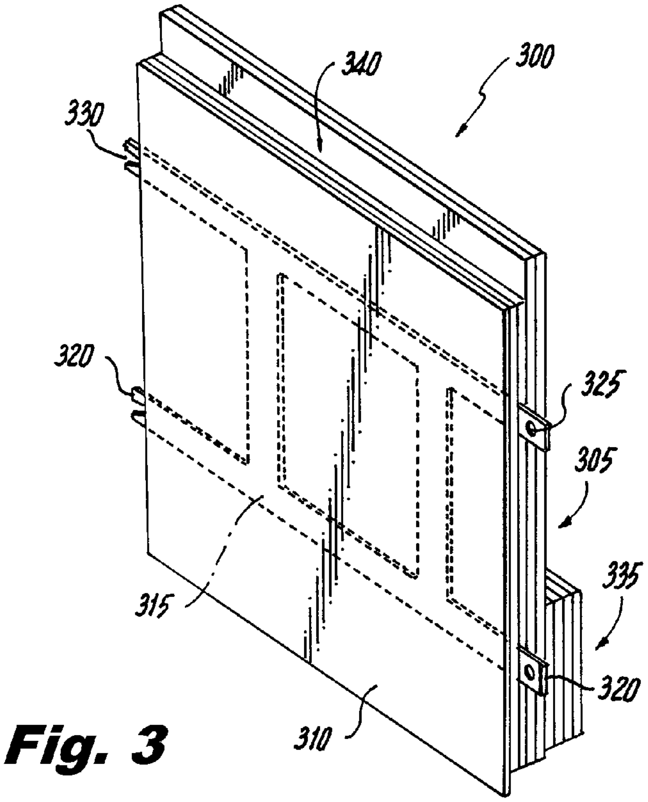
FIG. 3 shows a perspective view of a lower insulating panel in accordance with an illustrative embodiment of the invention.

FIGS. 2A-2C, in turn, show various views of an intermediate insulating panel 200 in accordance with an illustrative embodiment of the invention. More particularly, FIG. 2A shows a perspective view of the intermediate insulating panel 200, while FIG. 2B shows a sectional view of the intermediate insulating panel 200 and FIG. 2C shows a magnified portion of the FIG. 2B sectional view. In a manner similar to the upper insulating panel 100 described above, the intermediate insulating panel 200 is formed from a stack of panel insulating layers 205 and comprises mounting strips 210 that form lateral mounting extensions 215 with respective holes 220 and slots 225 on opposing sides of the intermediate insulating panel 200. Nevertheless, in contrast to the upper insulating panel 100, the intermediate insulating panel 200 is devoid of a block portion and the stack of panel insulating layers 205 in the intermediate insulating panel 200 defines a step feature 235 at both its top edge and its bottom edge. In fact, the step feature 235 at the top edge of the intermediate insulating panel 200 is inverse to the step feature 115 in the bottom edge of the upper insulating panel 100. This allows the intermediate insulating panel 200 and the upper insulating panel 100 to slidably overlap one another, as will be further described below. In addition, the intermediate insulating panel 200 includes its own protective cover 230, which extends slightly below the lowermost edge of the stack of panel insulating layers 205.

FIG. 2C shows some unique aspects of the intermediate insulating panels 200 which, in the present embodiment, are universal to the other types of insulating panels also. More precisely, FIG. 2C illustrates that the stack of panel insulating layers 205 of the intermediate insulating panel 200 is held together with a plurality of fasteners 240 (i.e., fixating devices). Appropriate fasteners 240 may include, as just a few non-limiting examples, nails, bolts, nuts, retainers, speed clips, and the like. That said, no single fastener 240 passes all the way from one side of the stack of panel insulating layers 205 to the opposite side of the stack of panel insulating layers 205. Such an arrangement helps to assure that the fasteners 240, which may be formed of a highly thermally conductive material such as steel or aluminum, do not act as conduits for the transfer of heat through the insulating panels 205, thereby reducing their effectiveness.

Finally, FIG. 3 shows a perspective view of the last type of insulating panel in the present illustrative embodiment, namely, a lower insulating panel 300. The lower insulating panel 300 also shares many of the aspects of the upper insulating panel 100. The lower insulating panel 300 is, for example, also formed by a stack of panel insulating layers 305 and is covered by a protective cover 310 that extends slightly beyond the lower edge of the stack of panel insulating layers 305. Mounting strips 315, moreover, provide additional strength and rigidity while forming lateral mounting extensions 320 with holes 325 and slots 330. However, rather than being at the top of the lower insulating panel 300, extra panel insulating layers 305 near the bottom of the lower insulating panel 300 act to form a block portion 335 that projects outward from the remainder of the lower insulating panel 300. At the same time, a step feature 340 formed in the stack of panel insulating layers 305 at the top edge of the lower insulating panel 300 is inverse to the step feature 235 found at the lower edge of the intermediate insulating panel 200. As was the case for the upper insulating panel 100 and the intermediate insulating panel 200, these step features 235, 340 in the intermediate insulating panel 200 and the lower insulating panels 300 give the intermediate insulating panel 200 and the lower insulating panel 300 the ability to slidably overlap one another.

Figure 4:
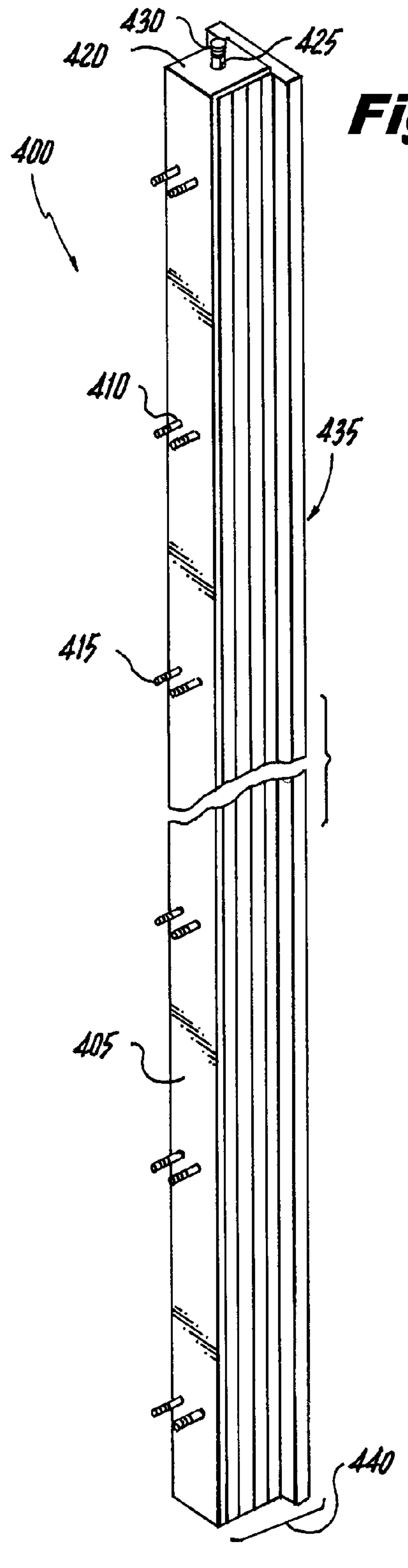
FIG. 4 shows a perspective view of a vertical support in accordance with an illustrative embodiment of the invention.

The various insulating panels 100, 200, 300 are affixed to a vessel via specialized vertical supports. FIG. 4 shows a perspective view of a representative example of such a vertical support 400, in accordance with an illustrative embodiment of the invention. The vertical support 400 comprises an elongate vertical strip 405 that defines a set of holes 410 therein sized to allow bolts 415 to extend therefrom. The holes 410 are arranged in pairs that run down the length of the vertical strip 405. The vertical strip 405 also comprises an angled extension 420 near its top that is approximately normal to the remainder of the vertical strip 405 and defines a mounting hole 425 therein with an upward-facing bolt 430 protruding therefrom. Affixed to the back of the vertical strip 405 is a stack of support insulating layers 435 that combine to form an insulating strip 440. The support insulating layers 435 of the insulating strip 440 are fixated to each other and to the vertical strip 405 via a plurality of fasteners (not explicitly shown). As was the case for the fasteners of the insulating panels 100, 200, 300, the fasteners for the vertical supports 400 may include nails, bolts, nuts, retainers, speed clips, and others. Notably, the support insulating layer 435 in the insulating strip 440 that is disposed the farthest distance from the vertical strip 405 is somewhat wider than the remaining support insulating layers 435. As will be detailed below, this feature helps to form a slidably overlapping interface with the lateral edges of the insulating panels 100, 200, 300.

Figure 5A:
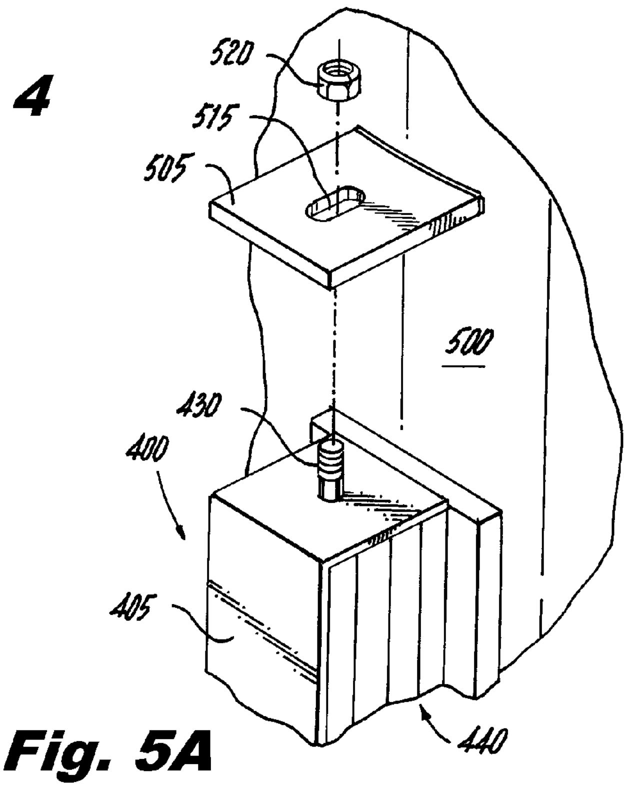
FIG. 5A shows an exploded perspective view of the manner in which the FIG. 4 vertical support is attached to a vessel.
Figure 5B:
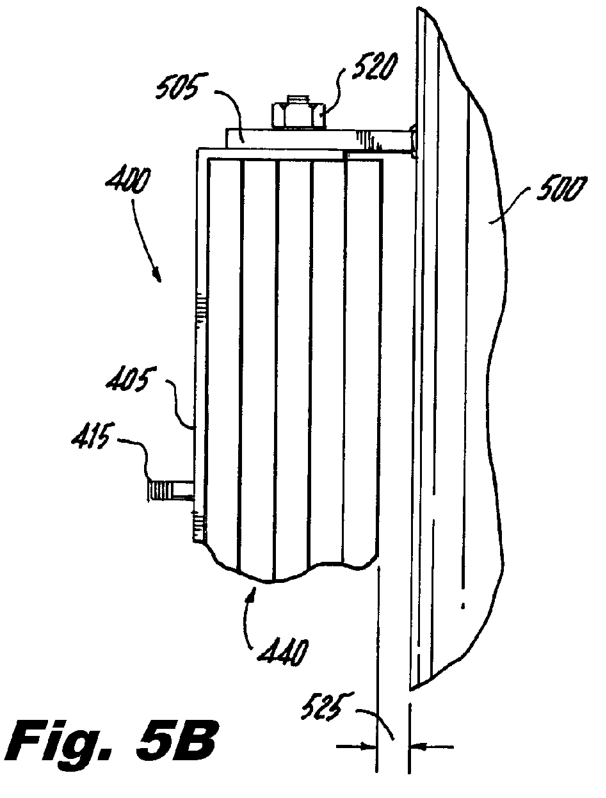
FIG. 5B shows a side elevational view of the FIG. 4 vertical support attached to a vessel.

FIGS. 5A-7C go on to describe the manner in which the above-described insulating panels 100, 200, 300 and vertical supports 400 may be fixated to a heated vessel to form a novel external insulation system in accordance with an illustrative embodiment of the invention. FIG. 5A, for example, shows an exploded perspective view of the manner in which the vertical support 400 may be attached to an exemplary vessel 500, while FIG. 5B shows a side elevational view of the same elements. When attached to the vessel 500, the vertical strip 405 and the insulating strip 440 of the vertical support 400 run substantially vertically along a wall of the vessel 500. Notably, the vertical support 400 is only attached to the vessel 500 at one location on the vessel 500. More particularly, in this particular illustrative embodiment, the vessel 500 comprises an anchor plate 505 that protrudes outward from the wall of the vessel 500 near the top of the vessel 500 and defines a slot 515. The anchor plate 505 may, for example, be welded or otherwise adhered to the wall of the vessel. The bolt 430 passes through the slot 515 in the anchor plate 505 and is captured by a nut 520 to provide a secure means of attachment therebetween. So attached, the vertical support 400 rigidly hangs from the anchor plate 505 while paralleling a wall of the vessel 500 but not directly contacting that wall. That is, there is an air gap 525 (i.e., vapor space) between the vertical support 400 and the vessel 500.

Figure 6:
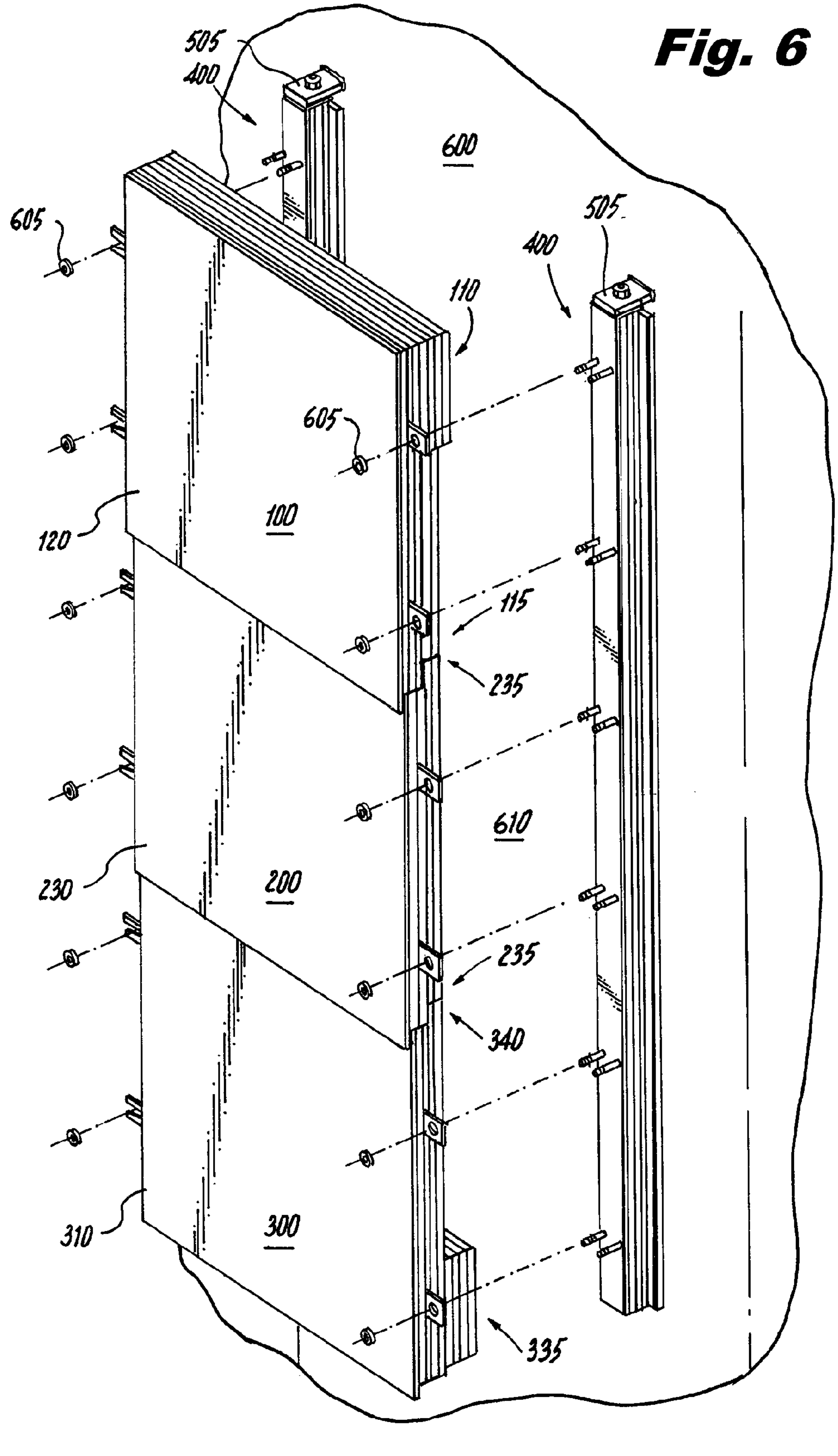
FIG. 6 shows an exploded perspective view of the FIG. 1 upper insulating panel, the FIG. 2A intermediate insulating panel, and the FIG. 3 lower insulating panel attached to a vessel via two FIG. 4 vertical supports.

FIG. 6 shows an exploded perspective view of the upper insulating panel 100, the intermediate insulating panel 200, and the lower insulating panel 300 attached to a vessel 600 via two vertical supports 400. The vertical supports 400 are operative to be fixated to the vessel 600 in the manner indicated with reference to FIGS. 5A and 5B, that is, utilizing respective bolts 430, anchor plates 505, and nuts 520. In the present embodiment, the bolts 415 emerging from the vertical supports 400 (threads facing outward), allow the various insulating panels 100, 200, 300 to be supported between the vertical supports 400 via their respective lateral mounting extensions 130, 215, 320 and fixated by nuts 605 to form a series of insulating panels 100, 200, 300 that runs down the wall of the vessel 600. In the present embodiment, some flexibility in the insulating panels 100, 200, 300 allows them to conform somewhat to the curvature of the vessel 600. As fixated to the vertical supports 400 in this manner, each of the insulating panels 100, 200, 300 comprises at least one respective portion that slidably overlaps a respective portion of an adjacent insulating panel 100, 200, 300. More particularly, the step feature 115 at the lower edge of the upper insulating panel 100 slidably overlaps the inversely-arranged step feature 235 formed at the top edge of the intermediate insulating panel 200. At the same time, the step feature 235 at the bottom of the intermediate insulating panel 200 slidably overlaps the step feature 340 formed at the top edge of the lower insulating panel 300. What is more, a bottom edge of the protective cover 120 for the upper insulating panel 100 overlaps a top edge of the protective cover 230 for the intermediate insulating panel 200, while a bottom edge of the protective cover 230 for the intermediate insulating panel 200 overlaps a top edge of the protective cover 310 for the lower insulating panel 300. The three protective covers 120, 230, 310 thereby combine to form a continuous plate of protection for the underlying stacks of panel insulating layers 105, 205, 305 and the vessel 600.

Creating a single continuous insulating panel from a modular series of overlapping upper, intermediate, and lower insulating panels 100, 200, 300 in this manner has the advantage of being able to accommodate vessels of varying sizes. While the exemplary embodiment described with reference to FIG. 6, for example, only utilizes a series of three such insulating panels 100, 200, 300, a vessel with a greater height might utilize many more insulating panels to accommodate the additional height. In such a case, rather than just using one intermediate insulating panel 200, a plurality of intermediate insulating panels 200 may be inserted between the upper and lower insulating panels 100, 300.

The insulating panels 100, 200, 300, once fixated to the vertical supports 400 in the manner indicated in FIG. 6 form a portion of a total external insulation system that is well suited to providing thermal insulation for a heated vessel while, at the same time, accommodating the significant thermal expansion and contraction of the vessel that would be expected to occur while periodically heating the vessel to elevated temperatures and then allowing it to cool. As mounted, the series of insulating panels 100, 200, 300 shown in FIG. 6, for example, forms a larger air gap 610 between the vessel 600 and the insulating panels 100, 200, 300 that merges with the air gap 525 formed between the vertical supports 400 and the vessel 600 (see FIG. 5B). The air gap 610, in turn, is closed near the top and bottom of the vessel 600 by the respective block portions 110, 335 of the upper and lower insulating panels 100, 300, respectively. In such a manner, air circulation into and out of the air gap 610 is minimized, and the air gap 610 itself becomes a significant source of thermal insulation to the vessel 600. Even the vertical supports 400 comprise the insulating strips 440 so that the vertical supports 400 do not become a source of thermal leakage.

Thermal expansion and contraction of the vessel 600, in turn, is well accommodated by many aspects of the invention. As indicated above, for example, the vertical supports 400 are each fixated to the vessel 600 at only one respective location on the vessel 600. In this manner, the vertical supports 400 and the insulating panels 100, 200, 300 supported thereby are allowed to “float” above the wall of the vessel 600 and are not stressed by the expansion and contraction of the vessel 600 itself. At the same time, as further indicated above, the insulating panels 100, 200, 300 slidably overlap each other at their interfaces. The insulating panels 100, 200, 300 as well as the vertical supports 400 themselves are thereby allowed to expand and contract to some degree without creating undesirable gaps between the insulating panels 100, 200, 300 that would be detrimental to their insulating effects. Lastly, the slots 140, 225, 330 in many (e.g., half) of the lateral mounting extensions 130, 215, 320 on the insulating panels 100, 200, 300 allow the insulating panels 100, 200, 300 to be slidably fixated to at least some of the vertical supports 400. Such slidable fixation allows the vertical supports 400 to move laterally to some degree in response to the expansion and contraction of the vessel 600 without putting too much tensile or compressive stress on the insulating panels 100, 200, 300 themselves. Some lateral expansion and contraction of the vessel is thereby well accommodated.

Figure 7A:
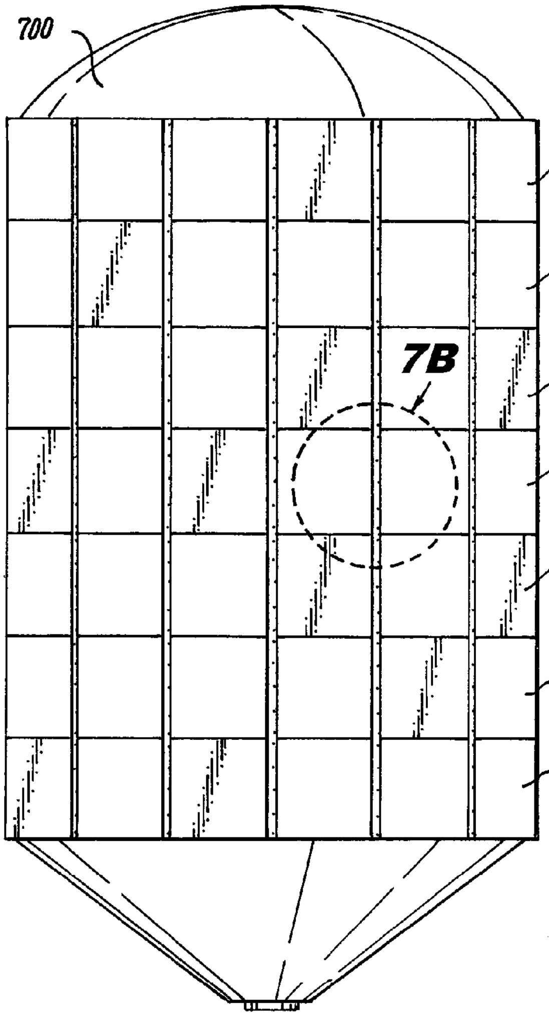
FIG. 7A shows a perspective view of a vessel with an external insulating system in accordance with aspects of the invention.
Figure 7B:
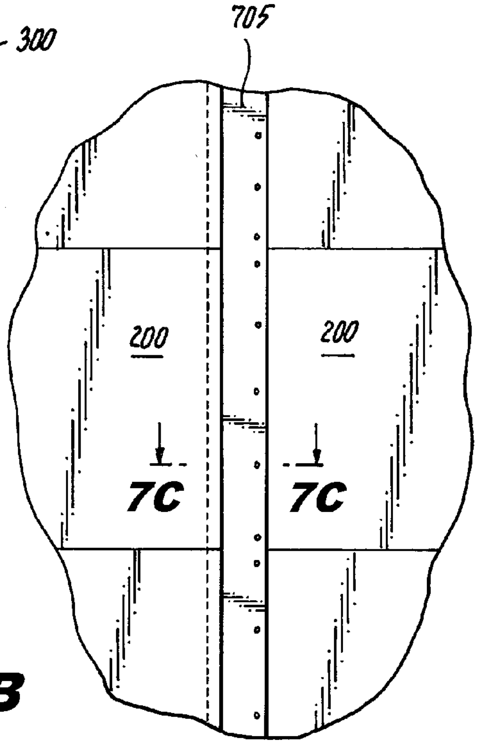
FIG. 7B shows a magnified side elevational view of the FIG. 7A vessel and external insulating system.

FIGS. 7A-7C shows a vessel 700 with the application of a multitude of insulating panels 100, 200, 300 and vertical supports 400 to form a unified external insulation system. FIG. 7A shows a perspective view of the vessel 700 and insulation system, while FIG. 7B shows a magnified view and FIG. 7C shows a sectional view taken along the line shown in FIG. 7B. Notably, a preferred, but optional, feature is added to this system, namely vertical support protective covers 705. As best seen in FIGS. 7B and 7C, the vertical support protective covers 705 act to cover the region occupied by the vertical supports 400 between the insulating panels 100, 200, 300. In the present embodiment, screws or some other suitable fixating device act to mount the vertical support protective covers 705 to the insulating panels 100, 200, 300 running along one side of a vertical support 400 (in this particular illustrative case, the right side of the vertical support 400 as viewed in FIGS. 7B and 7C). On the opposite side, the vertical support protective covers 705 are merely allowed to slide under the protective covers 120, 230, 310 of the adjacent insulating panels 100, 200, 300 so as to form a slidable coupling therewith. In this manner, the vertical support protective covers 705 also accommodate expansion and contraction of the underlying vessel 700. At the same time, the vertical support protective covers 705 provide protection for the vertical supports 400 from outside elements (e.g., water encroachment). In fact, the vertical support protective covers 705 in combination with the protective covers 120, 230, 310 of the insulating panels 100, 200, 300 act to form a continuous protective jacket over the entire external insulating system.

As was detailed above with reference to FIG. 4, the support insulating layer 435 in the stack of support insulating layers 435 that sits the farthest distance from the vertical strip 405 in the vertical supports 400 is somewhat wider than the remaining support insulating layers 435. A purpose for this feature is further elucidated in FIG. 7C. As will be seen in FIG. 7C, this wider support insulating layer 435 allows the insulating strip 440 to slidably overlap the lateral edges of the insulating panels 100, 200, 300. As a result, here again, some lateral expansion and contraction is accommodated without the forming of undesirable breaks in the insulation system.

The just-described external insulation system, as well as other embodiments in accordance with aspects of the invention, provide several advantages over conventional external insulation systems utilized to insulate heat vessels. Systems in accordance with aspects of the invention, for example, facilitate the localized inspection and maintenance of underlying vessels. To inspect and/or maintain an underlying vessel, only one or more insulating panels need to be removed. Removal of an insulating panel is as easy as removing several fasteners and then removing the insulating panel. Once the inspection and/or maintenance are completed, the same insulating panel can easily be replaced by simply performing the removal process in reverse order. There is, as a result, no need to remove large parts of the external insulation system to gain access. In comparison, in conventional external insulation systems, typically the whole external insulation system or a large part thereof must be removed to gain access to the underlying heated vessel. At the same time, external insulation systems according to aspects of the invention are easy to install, provide outstanding thermal isolation, allow adequate thermal expansion and contraction of the underlying heated vessels, are excellent barriers to the intrusion of water and other atmospheric elements, and are highly cost effective.

The panel insulating layers 105, 205, 305 for the various upper, intermediate, and lower insulating panels 100, 200, 300 as well as the support insulating layers 435 for the vertical supports 400 may be formed of a wide variety of thermally insulating materials, including, but not limited to, solids, semi-solids (e.g., foams), fibers, and aerogels. In one or more embodiments, the insulating layers 105, 205, 305, 435 may comprise, for example, at least one of a mineral fiber (e.g., mineral wool) and a ceramic (e.g., calcium silicate). The various protective covers 120, 230, 310, 705, on the other hand, preferably comprise a material that is resistant to external environmental factors such as precipitation, condensation, pollutants, and wind, and can protect the underlying insulating layers 105, 205, 305, 435 and vessel. The protective covers 120, 230, 310, 705 therefore preferably comprise a metallic material such as stainless steel or aluminum. Finally, the mounting strips 125, 210, 315 and the vertical strips 405 also preferably comprise a metallic material. Aluminum is preferred over stainless steel because aluminum is substantially lighter than steel, although either material as well as several others (e.g., plastic, fiberglass, etc.) are contemplated and may serve as equally suitable options. Aluminum may also facilitate some flexibility in the insulating panels 100, 200, 300 which helps the insulating panels 100, 200, 300 conform to any curvature in the underlying heated vessel.

It should again be emphasized that the above-described embodiments of the invention are intended to be illustrative only. Other embodiments can use different types and arrangements of elements for implementing the described functionality, as well as different method steps. These numerous alternative embodiments within the scope of the appended claims will be apparent to one skilled in the art from the teachings herein.

For example, while the insulating panels 100, 200, 300 are each shown in the various figures to include a particular number of panel insulating layers 105, 205, 305, such a depiction is merely for illustrative purposes and alternative embodiments could utilize very different arrangements. In practice, alternative embodiments of these elements might use insulating panels that have greater or fewer numbers of panel insulating layers 105, 205, 305 than the particular illustrative embodiments shown in the figures. Such alternative embodiments would still come within the scope of the invention.

As just one more example, FIG. 8 shows an alternative method for attaching an alternative vertical support 800 to a vessel. Here, the alternative vertical support 800 is shown without its insulating strip for added clarity, although in actual reduction to practice, the inclusion of such an insulating strip is preferred. Unlike the vertical support 400, the alternative vertical support 800 does not include a mounting extension. Instead, the alternative vertical support 800 is attached to a mounting adaptor 805 via a rod 810. The mounting adaptor 805, in turn, is fixated to the anchor plate 505 via a bolt 820, and washers 825. As was the case in the previous embodiment, the anchor plate 505 may be fixated to the vessel by, for example, welding or gluing.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in 35 U.S.C.

§112, ¶6. In particular, the use of "step of" in the claims herein is not intended to invoke the provisions of 35 U.S.C. §112, ¶6.

What is claimed is:

1. An apparatus comprising:

a vessel defining a first protruding feature and a second protruding feature;

a first vertical support, the first vertical support fixated to the vessel solely at the first protruding feature, and defining a first vertical plate with a first front face oriented away from the vessel;

a second vertical support, the second vertical support fixated to the vessel solely at the second protruding feature and apart from the first vertical support, and defining a second vertical plate with a second front face oriented away from the vessel; and a series of insulating panels, each insulating panel in the series of insulating panels supported between the first vertical support and the second vertical support such that each insulating panel in the series of insulating panels extends in thickness past the first front face and the second front face towards the vessel, and each insulating panel in the series of insulating panels slidably overlaps one or more adjacent insulating panels in the series of insulating panels;

wherein:

each insulating panel in the series of insulating panels comprises a respective stack of two or more panel insulating layers that run substantially parallel to each other;

the first vertical support comprises a first stack of two or more support insulating layers that run substantially parallel to each other, occupy a space between the first vertical plate and the vessel, and span a width of the first vertical plate;

the second vertical support comprises a second stack of two or more support insulating layers that run substantially parallel to each other, occupy a space between the second vertical plate and the vessel, and span a width of the second vertical plate; and each of the panel insulating layers and each of the support insulating layers comprises a non-metallic thermally insulating material.

2. The apparatus of claim 1, wherein the vessel is periodically heated above ambient temperature.

3. The apparatus of claim 1, wherein the vessel is made to periodically expand and contract.

4. The apparatus of claim 1, wherein the first vertical support defines a first elongate portion and the second vertical support defines a second elongate portion, the first elongate portion running substantially parallel with the second elongate portion.

5. The apparatus of claim 1, wherein the apparatus defines a first gap between the first vertical support and the vessel, and defines a second gap between the second vertical support and the vessel.

6. The apparatus of claim 1, wherein each of the stacks of two or more panel insulating layers defines a respective step feature therein.

7. The apparatus of claim 1, wherein each of the stacks of two or more panel insulating layers is held together by a respective plurality of fixating devices, each of the pluralities of fixating devices arranged so that no single fixating device passes all the way from one face of a stack of two or more panel insulating layers to an opposite face of that stack of two or more panel insulating layers.

8. The apparatus of claim 1, wherein the apparatus defines a gap between the series of insulating panels and the vessel.

9. The apparatus of claim 1, wherein a first insulating panel in the series of insulating panels defines a first block portion that projects from the remainder of the first insulating panel towards the vessel.

10. The apparatus of claim 9, wherein a last insulating panel in the series of insulating panels defines a second block portion that projects from the remainder of the last insulating panel towards the vessel.

11. The apparatus of claim 1, wherein each insulating panel in the series of insulating panels comprises a respective protective cover.

12. The apparatus of claim 1, wherein the series of insulating panels defines a plurality of mounting extensions, each mounting extension in the plurality of mounting extensions overlapping a respective portion of either the first vertical support or the second vertical support.

13. The apparatus of claim 12, wherein one or more mounting extensions in the plurality of mounting extensions define respective holes therein and one or more mounting extensions in the plurality of mounting extensions define respective slots therein.

14. The apparatus of claim 1, wherein at least one of the panel insulating layers comprises a mineral fiber material or a ceramic material.

15. The apparatus of claim 1, wherein the apparatus comprises at least one of steel and aluminum.

16. The apparatus of claim 1, wherein at least one of the panel insulating layers comprises an aerogel material.

17. The apparatus of claim 1, wherein at least one of the panel insulating layers comprises a foam material.

18. A method of insulating a vessel defining a first protruding feature and a second protruding feature, the method comprising the steps of:

fixating a first vertical support to the vessel solely at the first protruding feature, the first vertical support defining a first vertical plate with a first front face oriented away from the vessel;

fixating a second vertical support to the vessel solely at the second protruding feature and apart from the first vertical support, the second vertical support defining a second vertical plate with a second front face oriented away from the vessel; and installing a series of insulating panels, each insulating panel in the series of insulating panels supported between the first vertical support and the second vertical support such that each insulating panel in the series of insulating panels extends in thickness past the first front face and the second front face towards the vessel, and each insulating panel in the series of insulating panels slidably overlaps one or more adjacent insulating panels in the series of insulating panels;

wherein:

each insulating panel in the series of insulating panels comprises a respective stack of two or more panel insulating layers that run substantially parallel to each other;

the first vertical support comprises a first stack of two or more support insulating layers that run substantially parallel to each other, occupy a space between the first vertical plate and the vessel, and span a width of the first vertical plate;

the second vertical support comprises a second stack of two or more support insulating layers that run substantially parallel to each other, occupy a space between the second vertical plate and the vessel, and span a width of the second vertical plate; and each of the panel insulating layers and each of the support insulating layers comprises a non-metallic thermally insulating material.

19. An external insulation system for use with a vessel defining a first protruding feature and a second protruding feature, the external insulation system comprising:

a first vertical support defining a first vertical plate with a first front face, the first vertical support adapted to be fixated to the vessel solely at the first protruding feature such that the first front face is oriented away from the vessel;

a second vertical support defining a second vertical plate with a second front face, the second vertical support adapted to be fixated to the vessel solely at the second protruding feature and apart from the first vertical support such that the second front face is oriented away from the vessel;

a series of insulating panels, each insulating panel in the series of insulating panels adapted to be supported between the first vertical support and the second vertical support such that each insulating panel in the series of insulating panels extends in thickness past the first front face and the second front face towards the vessel, and each insulating panel in the series of insulating panels slidably overlaps one or more adjacent insulating panels in the series of insulating panels;

wherein:

each insulating panel in the series of insulating panels comprises a respective stack of two or more panel insulating layers that run substantially parallel to each other;

the first vertical support comprises a first stack of two or more support insulating layers that run substantially parallel to each other, occupy a space between the first vertical support and the vessel when the first vertical support is fixated to the vessel, and span a width of the first vertical plate;

the second vertical support comprises a second stack of two or more support insulating layers that run substantially parallel to each other, occupy a space between the second vertical plate and the vessel when the second vertical support is fixated to the vessel, and span a width of the second vertical plate; and each of the panel insulating layers and each of the support insulating layers comprises a non-metallic thermally insulating material.

* * * * *